(12) United States Patent
Gopalan et al.

(10) Patent No.: US 9,740,924 B1
(45) Date of Patent: Aug. 22, 2017

(54) FEATURE-BASED POSE DETECTION

(71) Applicant: Amazon Technologies, Inc., Seattle, WA (US)

(72) Inventors: Sowmya Gopalan, Cupertino, CA (US); Manika Puri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 14/498,160

(22) Filed: Sep. 26, 2014

(51) Int. Cl.
*G06K 9/00* (2006.01)
*G06K 9/46* (2006.01)

(52) U.S. Cl.
CPC ..... *G06K 9/00389* (2013.01); *G06K 9/00536* (2013.01); *G06K 9/4604* (2013.01); *G06K 9/4642* (2013.01)

(58) Field of Classification Search
CPC ............. G06K 9/00389; G06K 9/4642; G06K 9/4604; G06K 9/00536
See application file for complete search history.

(56) References Cited

U.S. PATENT DOCUMENTS

2010/0215257 A1*  8/2010  Dariush .................... G06K 9/48
                                                         382/159
2013/0271397 A1* 10/2013  MacDougall ........... G06F 3/017
                                                         345/173

OTHER PUBLICATIONS

Mori, Greg, Serge Belongie, and Jitendra Malik. "Efficient shape matching using shape contexts." IEEE Transactions on Pattern Analysis and Machine Intelligence 27.11 (2005): 1832-1837.*
Ling, Haibin, and David W. Jacobs. "Shape classification using the inner-distance." IEEE transactions on pattern analysis and machine intelligence 29.2 (2007): 286-299.*
Mori, et al., "Efficient Shape Matching Using Shape Context" IEEE Transactions on Pattern Analysis and Machine Intelligence, vol. 7, No. 11, Nov. 2005, 1832-1837US.
Gao, et al., "A Variable Bin Width Histogram based Image Clustering Algorithm", IEEE Fourth International Conference Semantic Computing, Oct. 2010, 7 pages.
Grauman, et al., "The Pyramid Match Kernel:Discriminative Classification with Sets of Image Features", n Proceedings of the IEEE International Conference on Computer Vision, Beijing, China, Oct. 2005, 8 pages.

* cited by examiner

*Primary Examiner* — Bhavesh Mehta
*Assistant Examiner* — Menatoallah Youssef
(74) *Attorney, Agent, or Firm* — Lee & Hayes, PLLC

(57) ABSTRACT

In order to classify the presented pose of a human hand, a feature distribution map of the pose is compared to reference feature distribution maps. To generate a feature distribution map, each contour point of a hand is analyzed to determine a corresponding feature set. The feature set of a contour point includes a distance feature and an angle feature of the contour point in relation to one of its neighboring contour points. The feature sets generated from an observed pose are compared to feature sets of reference poses to determine which of the reference poses most closely matches the presented pose.

10 Claims, 4 Drawing Sheets

FEATURE-BASED POSE DETECTION

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system. A hand gesture may be detected by monitoring sequences of hand positions and poses.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
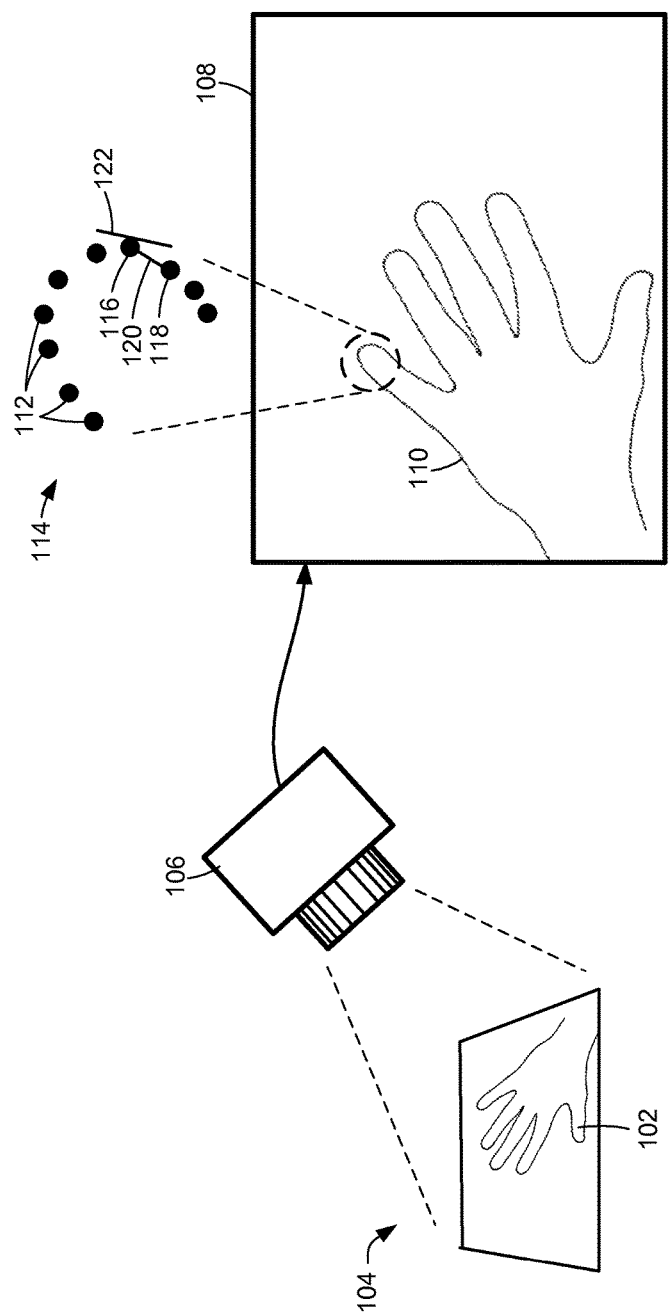
FIG. 1 is a block diagram conceptually illustrating a technique for identifying fingers and their positions based on a depth image.

This disclosure describes systems and techniques for detecting and discriminating between poses of a human hand or other objects. The pose of a hand indicates the relative positions and orientations of the hand, the fingers of the hand, and the parts or segments of the fingers. Hand poses may be detected and monitored over time to recognize hand gestures.

Generally, an observed object pose is identified by comparing its feature sets with feature sets of multiple reference poses that have been manually classified in a training process.

More specifically, one or more images are analyzed to obtain contour points corresponding to a contour of an observed hand or other object that is presenting a pose. For each contour point, multiple feature sets are constructed based on relationships of the contour point to other contour points. In the described embodiment, a feature set for a contour point has two feature values, defined by spatial characteristics between the contour point and another contour point. As an example, one of the feature values may comprise the distance between the contour point and the other point. As another example, one of the feature values may comprises an angle between the contour point and the other point, such as the angle between the tangent at the point and the line between the contour point and the other point. Multiple such feature sets are calculated for each point, based on its spatial relationship with multiple other contour points.

A presented feature density map is generated based on the feature sets of the contour points. The feature density map indicates a quantized distribution of the feature sets over the possible ranges of the feature values. In the described embodiment, the observed feature density map comprises a histogram having multiple bins, where each bin has a value equal to the number of feature sets whose values are within corresponding distance and angle intervals or ranges.

The presented feature density map is compared to similarly constructed reference feature density maps, which correspond respectively to known and pre-classified reference poses. The comparison is performed to find one of the reference feature density maps whose feature distribution most closely matches the feature distribution of the presented feature density map. The presented pose of the currently observed hand is then classified as the classified pose of the matching reference pose.

In some embodiments, the feature density maps may be hierarchical. For example, a sub-histogram may be generated for each upper-level bin of the feature-density map. When comparing the presented feature density map to a reference feature density map, the comparison may be first performed at a top level, where the top level has a relative high level of quantization and low level of resolution. The initial comparison may identify a candidate group of reference maps, which may then be compared at lower quantization, higher resolution levels of the reference maps. A feature density map may contain two, three, or more hierarchical levels such as this. Alternatively, the comparison may be performed over corresponding bins of all levels of histograms, with the comparisons at the lower, higher-resolution levels being given more weight.

FIG. 1 shows example techniques for evaluating an image in this manner to detect the presented pose of an observed human hand 102 within an observed scene 104. In this example, a camera or sensor 106 captures or produces an image 108 of the scene 104 containing the hand 102. In the example shown, the sensor 106 may comprise a color camera that produces a two-dimensional color image. The image 108 comprises a rectangular array of pixel values, each of which corresponds to point on a surface that is observed by the sensor 106 within the scene 104. Each pixel value indicates the color of the corresponding surface point. In other embodiments, the image 108 may comprise a depth image, where each pixel indicates the relative distance or depth of the corresponding surface point. In some embodiments, optical images and depth images may be used in conjunction with each other as the basis for ensuing analyses.

A contour 110 of the hand 102 is identified by analyzing the image 108. The contour 110 comprises points along the outer border or boundary of the hand. The contour 110 may be identified by first segmenting the image 108 to identify points that are formed by the surface of the hand 102 and then identifying the points along the border of the hand 102. Segmenting may be performed by skin color analysis to identify groups or areas of points whose color, texture, and/or intensity are consistent with those of a human hand. Edge detection and clustering techniques may be used in conjunction with skin color analysis to identify similar groups or clusters of pixels. Shape recognition may in some cases be used to identify segments corresponding to hands. Edge detection and shape recognition may in some embodiments rely in part on three-dimensional scene information such as may be obtained from depth maps or depth images of the scene 104.

The contour 110 comprises a series of adjacent points 112 as indicated by the exploded portion 114 of FIG. 1. Each given point has two neighboring points, which are the adjacent points on opposite sides of the given point.

The pose of the hand 102 is characterized by a collection of feature sets, wherein the collection comprises one or more feature sets for each point 112 of the contour 110. Each feature set has two feature values, which are defined by corresponding spatial characteristics of the point, which may include spatial relationships between the point and other points. The feature values of a given point are based on spatial relationships of the point to one or more other contour points. In the described embodiment, each feature value of a selected contour point comprises a distance and an angle between the selected point and another point. In the described embodiment, multiple feature sets are calculated for each contour point, based on spatial relationships between the contour point and each of the other contour points.

With reference to FIG. 1, an example feature set comprises feature values of a selected contour point 116 that are based on its positional or spatial relationship with an immediately neighboring contour point 118. The first feature value comprises the Euclidean distance between the selected point 116 and the neighboring point 118. The second feature value comprises an angle between the selected point 116 and the neighboring point 118. For example, the angle may comprise the angle between the tangent 122 of the selected point 116 and the line 120 connecting the selected point 116 and the neighboring point 118.

The direction or angle of the tangent 122 of a particular point 116 may be calculated as the angle of a line connecting the two oppositely neighboring points of the selected point 116, or as the angle of a line connecting points that are 2, 3, or 4 points on either side of the selected point 116. In some cases, a line may be fitted to a group of contour points on either side of the selected point to define the tangent of the selected point. Other techniques for determining the tangent of a contour point may also be used.

The angle between two neighboring points may be defined in different ways, such as the difference between the directions of the tangents of two neighboring contour points.

Furthermore, although distance and angle are describe as examples of feature values, a feature set may comprise any number of feature values, and the feature values themselves may comprise different parameters and/or may represent different characteristics.

Figure 2:
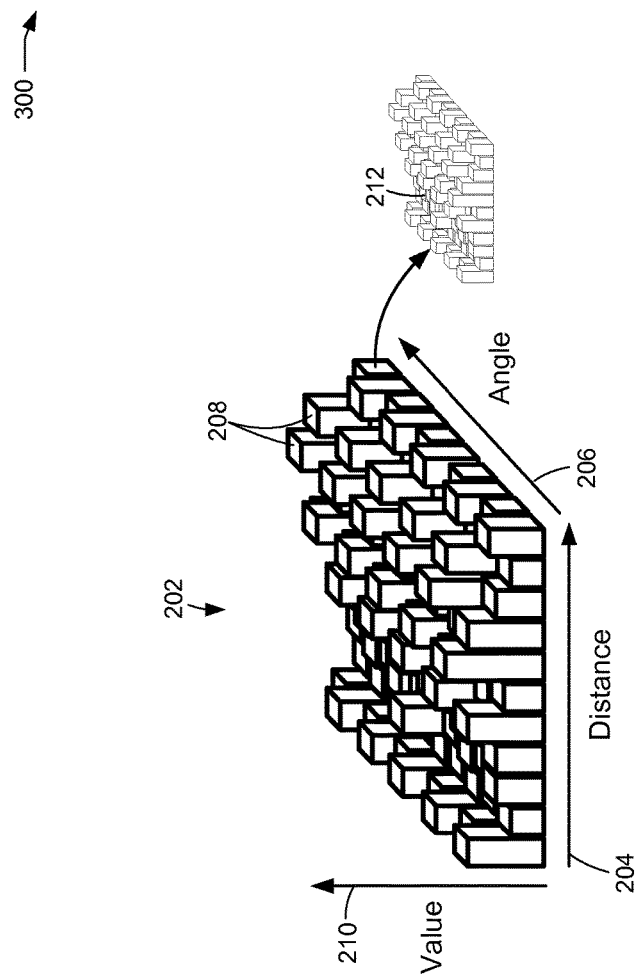
FIG. 2 is a feature distribution map indicating a distribution of contour feature sets.

FIG. 2 shows an example of a feature distribution or feature density map 202 that indicates a distribution or density of the feature sets described above as a function of their distance and angle values. In this example, the feature density map 202 comprises a two-dimensional histogram. A first axis 204 of the histogram corresponds to distance values. A second axis 206 of the histogram corresponds to angle values.

The histogram has multiple bins 208, each of which corresponds an interval or range of distance values and an interval or range of angle values. Each bin has a bin value, as conceptually indicated in FIG. 1 by height of the bin in accordance with a vertical axis 210. The value of a bin 208 is equal to the number of feature sets whose feature values fall within the intervals of the bin. More specifically, the value of a given bin is equal to the number of feature sets having both (a) a distance value that falls within the distance interval of the bin and (b) an angle value that falls within the angle interval of the bin. As an example, a particular bin may indicate the number of feature sets having a distance value between 5 and 10 and an angle value between 9° and 18°. The bin is also said to "contain" such feature sets.

The histogram bins 208 may have uniform depths and widths, meaning that the distance and angle intervals of the bins are uniformly sized. Alternatively, different bins may have different and non-uniform sizes, such as different widths and/or depths, with some bins having larger or smaller distance or angle intervals. The sizes of such bins may be determined by evaluating features sets of many poses and identifying groups or clusters of the feature sets. For example, k-means clustering algorithms may be used to quantize a large number of feature sets into a specified number of clusters, where each feature set belongs to the cluster with the nearest mean. The intervals of the bins may be established such that each bin corresponds to one of the clusters.

In some cases, the histogram may have a hierarchical bin structure, wherein each bin comprises an array of sub-bins or sub-histograms. At an upper level, for example, a histogram may have a size of 10 bins by 10 bins, and may indicate the number of feature sets contained by those bins. In addition, however, the feature sets of a particular bin may be further analyzed to create a lower level histogram 212 within each upper level bin, wherein the lower level histogram 212 indicates a more finely-grained distribution of the feature sets contained by the upper level bin. For example, each lower level histogram 212 may also have a size of 10 bins by 10 bins, with corresponding sub-intervals that are smaller than and within the intervals of the corresponding upper-level bin. Each bin of a higher-level histogram therefore indicates the number of feature values within the bins of the corresponding sub-histogram. A hierarchical histogram may be constructed having multiple hierarchical levels, such as three, four, or more levels.

Figure 3:
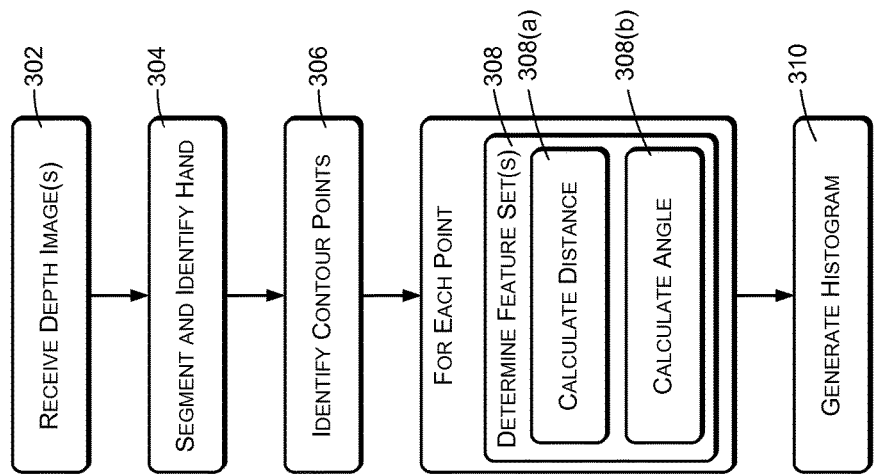
FIG. 3 is a flow diagram illustrating an example method of generating a feature distribution map.

FIG. 3 shows an example method 300 of generating a feature distribution map based on an image contour. An action 302 comprises receiving one or more images of a scene that contains a hand or a portion of a hand that is presenting a pose. The one or more images may include color images, depth maps, three-dimensional point clouds, etc., which represent points of the scene.

An action 304 comprises segmenting the images in accordance with available image segmentation techniques to identify points of the scene corresponding to the surface of the hand. Segmentation may be based on color/intensity analysis, texture analysis, edge detection, shape detection, three-dimensional surface analysis, or any of various other image segmentation techniques.

An action 306 comprises identifying contour points of the hand. This may be performed by any of various available techniques, based on the identified segment of the image corresponding to the hand. The contour points comprise the points on the outer border of the identified segment. As shown above in FIG. 1, each contour point has two adjacent contour points, which are referred to as neighboring contour points.

An action 308 is performed for each of multiple contour point identified in the action 306. With regard to a selected contour point, the action 308 comprises determining multiple feature sets for the contour point, where each feature set is based on one or more spatial characteristics of the contour point. More specifically, in the described embodiment each feature set is based on one or more spatial relationships between the contour point and another one of the contour points. For each contour point, a feature set is calculated corresponding to each of the other contour points.

The action 308 may comprise an action 308(a) of calculating the Euclidian distance between the selected contour point and another contour point and an action 308(b) of calculating an angle between the selected contour point and the other contour point. The action 308(b) may in some embodiments comprise calculating the difference between the angle of a line connecting the two contour points and the angle of the tangent of either the selected contour point or the other point. The feature set of the selected contour point comprises the distance calculated in the action 308(a) and the angle calculated in the action 308(b).

An action 310 comprises generating a histogram, also referred to herein as a feature distribution map or feature density map, having multiple histogram bins and corresponding bin values. Each histogram bin corresponds to a first value interval and a second value interval. The value of each bin is equal to the number of feature sets having (a) a first feature value within the first value interval and (b) a second feature value within the second value interval. More specifically, each histogram bin corresponds to a distance interval and an angle interval. The value of each bin is equal to the number of feature sets having (a) a distance value within the distance interval of the bin and (b) an angle value within the angle interval of the bin.

In some embodiments, the action 310 may comprise generating a hierarchical histogram having multiple increasing levels of resolution. For example, the action 310 may comprise generating a first histogram having multiple bins, each corresponding to a value interval, wherein each bin indicates a number of feature values that are within the corresponding value interval. The action 310 may further comprise generating a second histogram, referred to as a sub-histogram, corresponding to a first bin of the first histogram, wherein the first bin corresponds to a first value interval. The second histogram may have multiple sub-bins corresponding respectively to sub-intervals that are within the first value interval, wherein each sub-bin indicates a number of the feature values that are within the corresponding sub-interval, and wherein the value of the first bin is equal to the number of feature values within the bins of the second, sub-histogram. A sub-histogram may be generated in this manner for every bin of the first histogram. Further levels of sub-histograms may also be generated in this manner, with each level having a higher resolution and lower quantization than the last.

Figure 4:
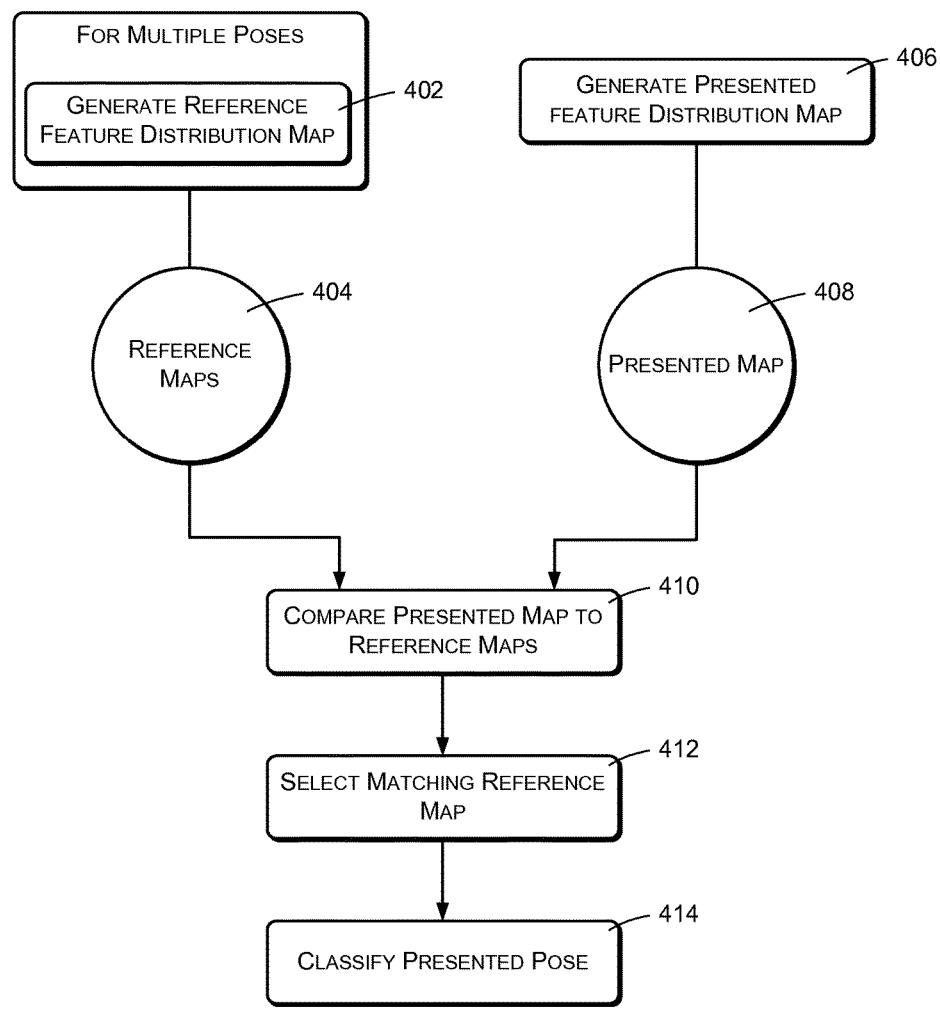
FIG. 4 is a flow diagram illustrating an example method of classifying a presented hand pose.

FIG. 4 illustrates an example method 400 of determining or identifying the presented pose of a hand based on a feature distribution map as described above. An action 402 comprises generating multiple reference feature distribution maps 404 corresponding respectively to each of multiple reference hand poses. The action 402 may comprise performing the method 300 with respect to multiple images containing hands in multiple poses, and manually classifying the poses presented by the hands of the images. Each reference feature distribution map 404 therefore corresponds to a respective, classified hand pose. The action 402 may be performed in a training or calibration procedure when designing a gesture recognition system, prior to actual implementation of the system. All of the reference feature distribution maps 404 use a common, predefined quantization scheme and hierarchical structure.

An action 406 comprises generating a presented feature distribution map 408, based on a observed hand having an unclassified pose. The action 406 may comprise performing the method 300 with respect to an image of the observed hand. The presented feature distribution map 408 is generated to have the same quantization scheme and hierarchical structure as the reference feature distribution maps 404.

An action 410 comprises comparing the observed feature distribution map 408 to each of the reference feature distribution maps 404. The action 410 may comprise determining a measure of the difference between each of the reference feature distribution maps 404 and the observed feature distribution map 408. The difference may be calculated for each reference feature distribution map 404 by (a) calculating the difference between each bin value of the reference feature distribution map and the corresponding bin value of the observed feature distribution map 408 and (b) summing the differences across all of the bins.

The action 410 may be performed in a hierarchical manner, in accordance with the hierarchical structure of the distributions maps. For example, differences may be first calculated at a high level of bin quantization to obtain a rough classification of an observed hand pose. Subsequently, differences may be calculated at successively lower hierarchical levels corresponding to smaller bin sizes. Finer differentiation between poses may result at each lower hierarchical level. In some cases, however, a captured image may provide insufficient resolution to support analyses at the more granular levels of the lower-level histogram hierarchies. A hierarchical approach such as this reduces the trade-off between noise robustness and descriptive power that is otherwise an inherent difficulty of using histograms.

An action 412 comprises selecting the reference feature distribution map 408 having the smallest difference. An action 414 comprises classifying or declaring the presented pose in accordance with the classification of the matching reference pose.

Poses of a hand within an observed scene may be detected and tracked over time to recognize hand gestures, which may signal various types of user commands.

Figure 5:
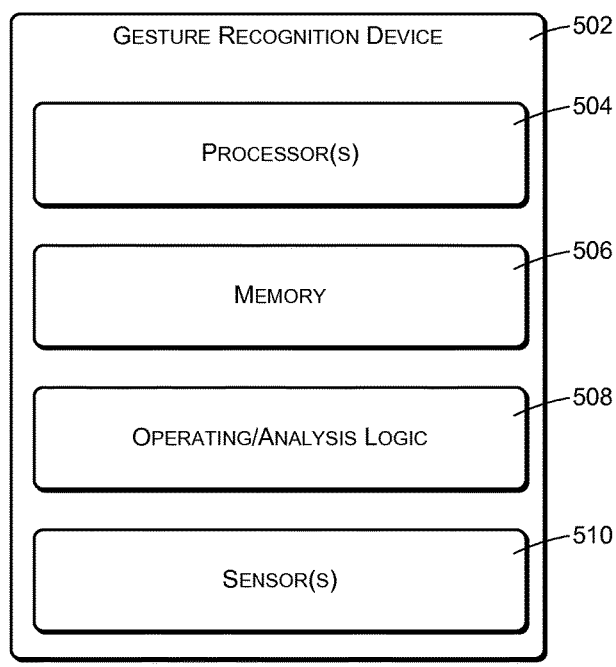
FIG. 5 is a block diagram of an example device that may be configured to identify the poses of hands and other objects based on the techniques described herein.

FIG. 5 illustrates high-level components of a device 502 that may be configured to implement the methods and techniques described above. In some embodiments, the device 502 may comprise a gesture recognition device that recognizes hand and finger actions, positions, and gestures that are performed as user input to a computing device or other automated system. Note that the device 602 may have other components that are not shown.

Logical functionality of the device 502 may be implemented by one or more processors 504, associated computer-readable memory 506, and software that is stored in the memory 506 and executed by the processor 504. The one or more processors 504 may include a processor having multiple cores as well as digital signal processors, application-specific integrated circuits (ASICs) and/or other types of processing devices. The software may comprise computer-executable instructions or programs.

The memory 506 may be a type of non-transitory computer-readable storage media and may include volatile and nonvolatile memory. Thus, the memory 506 may include, but is not limited to, RAM, ROM, EEPROM, flash memory, magnetic memory media, optical memory media, or other memory technology. The memory 506 may also comprise media that is used for transferring data and software, such as CD-ROMs, DVDs, memory sticks, etc. The memory 506 may reside in or be provided by various components of the device 502. The memory 506 may in some cases may be external to the device 502 and may accessed through network communications or other interfaces including wireless interfaces.

Software of the device 502 may include operating and analysis logic 608 that implements general functionality of the device 502 as described herein. The operating and analysis logic 508 may include an operating system, drivers for physical elements of the device 502, applications for performing specific functions or tasks, communication interfaces, etc. In the context of the example implementations described above, the operating and analysis logic 508 may include instructions that, when executed by the processors 504, cause the processor 504 to perform the acts described herein.

The gesture recognition device may also contain or be associated with one or more sensors 510, which may include one or more cameras, image sensors, or other sensors for capturing images such as those described above. Sensors may include color or infrared cameras, depth sensors, depth cameras, video cameras, etc.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors;
a camera configured to capture an image of a scene that includes a hand, the image having pixels corresponding to points of the scene;
one or more computer-readable media storing computer-executable instructions that, when executed by the one or more processors, cause the one or more processors to perform acts comprising:
analyzing the image to identify contour points of the hand;
determining a plurality of feature sets for the contour points, wherein the plurality of feature sets includes a first feature set corresponding to a first contour point and a second contour point, the first feature set includes a distance value corresponding to a distance between the first contour point and the second contour point, and the first feature set includes an angle value corresponding to an angle between a tangent of the first contour point and a line connecting the first and second contour points;
generating a higher level histogram having multiple higher level bins, wherein each higher level bin corresponds to a distance interval and an angle interval, and wherein a bin value of each higher level bin is equal to a first number of feature sets of the plurality of feature sets having (a) a distance value corresponding to a distance within the distance interval of the higher level bin and (b) an angle value corresponding to an angle within the angle interval of the higher level bin, and wherein a size of a distance interval of a first higher level bin is different from a size of a distance interval of a second higher level bin, and a size of an angle interval of the first higher level bin is different from a size of an angle interval of the second higher level bin;
comparing each bin value of the higher level histogram with a corresponding bin value of a reference histogram, wherein the reference histogram corresponds to a reference hand pose;
analyzing feature sets of at least one higher level bin of the multiple higher level bins of the higher level histogram;
generating, based at least in part on the analyzing, a lower level histogram having multiple lower level bins, wherein each lower level bin corresponds to a distance interval smaller than a distance interval of the at least one higher level bin and an angle interval smaller than an angle interval of the at least one higher level bin, and wherein a bin value of each lower level bin is equal to a second number of feature sets having (a) a distance value corresponding to a distance within the distance interval of the lower level bin and (b) an angle value corresponding to an angle within the angle interval of the lower level bin; and
determining a hand gesture of the hand based at least in part on the reference histogram.

2. The system of claim 1, the acts further comprising:
comparing each lower level bin value of the lower level histogram with a corresponding lower level bin value of a lower level reference histogram.

3. The system of claim 1, wherein the comparing comprises:
for each bin value of the higher level histogram, determining a difference between the bin value and a corresponding bin value of the reference histogram; and
summing the differences.

4. The system of claim 1, wherein the higher level histogram has a hierarchical structure and the reference histogram has the hierarchical structure.

5. The system of claim 1, wherein the size of the distance interval and the size of the angle interval of the first higher level bin is determined by evaluating feature sets of a plurality of images of a plurality of scenes that include the hand, and identifying clusters of the feature sets, the distance interval and the angle interval of the first higher level bin corresponding to at least one cluster of the clusters.

6. A method, comprising:
obtaining contour points corresponding to a contour of a hand;
determining a plurality of feature sets for the contour points, wherein the plurality of feature sets includes a first feature set corresponding to a first contour point, the first feature set includes a distance value corresponding to a distance between the first contour point and a second contour point, and an angle value corresponding to an angle between a tangent of the first contour point and a line connecting the first and second contour points;
generating a higher level histogram having multiple higher level bins, wherein each higher level bin corresponds to a distance interval and an angle interval, and wherein a bin value of each higher level bin is equal to a first number of feature sets of the plurality of feature sets having (a) a distance value corresponding to a distance within the distance interval of the higher level bin and (b) an angle value corresponding to an angle within the angle interval of the higher level bin, and wherein a size of a distance interval of a first higher level bin is different from a size of a distance interval of a second higher level bin, and a size of an angle interval of the first higher level bin is different from a size of an angle interval of the second higher level bin;
analyzing feature sets of at least one higher level bin of the multiple higher level bins of the higher level histogram;
generating, based at least in part on the analyzing, a lower level histogram having multiple lower level bins, wherein each lower level bin corresponds to a distance interval smaller than a distance interval of the at least one higher level bin and an angle interval smaller than an angle interval of the at least one higher level bin, and wherein a bin value of each lower level bin is equal to a second number of feature sets having (a) a distance value corresponding to a distance within the distance interval of the lower level bin and (b) an angle value corresponding to an angle within the angle interval of the lower level bin; and determining a hand gesture of the hand based at least in part on the reference histogram.

7. The method of claim 6, further comprising comparing each bin value of the higher level histogram with a corresponding bin value of a reference histogram, wherein the reference histogram corresponds to a reference pose of the hand.

8. The method of claim 7, further comprising comparing the bin values of the higher level histogram with corresponding bin values of a second reference histogram, wherein the second reference histogram corresponds to a second reference pose of the hand object.

9. The method of claim 6, wherein the higher level histogram has a hierarchical bin structure.

10. The method of claim 6, wherein the size of the distance interval and the size of the angle interval of the first higher level bin is determined by evaluating feature sets of a plurality of images of a plurality of scenes that include the hand, and identifying clusters of the feature sets, the distance interval and the angle interval of the first higher level bin corresponding to at least one cluster of the clusters.

* * * * *